United States Patent Office 3,041,323
Patented June 26, 1962

3,041,323
CHEMICAL PROCESS AND PRODUCT
Hugh E. Ramsden, Scotch Plains, N.J., assignor to Metal & Thermit Corporation, Woodbridge Township, N.J., a corporation of New Jersey
No Drawing. Filed Aug. 14, 1958, Ser. No. 754,927
6 Claims. (Cl. 260—92.8)

The present invention relates to the preparation of modified polyvinyl chloride resins. This application is a continuation-in-part of my application Serial No. 549,541, filed November 28, 1955, now abandoned.

Polyvinyl chloride polymers are notoriously inert. It has not heretofore been possible to modify such polymers after they are once polymerized. I have now discovered a process for modifying the polymers.

It is an object of the present invention to provide modified polyvinyl chloride polymers.

It is a further object of this invention to provide an efficient process for the modification of polyvinyl chloride polymers.

It is another object of this invention to provide reactive polyvinyl chloride polymers which may be further reacted to provide permanently modified polyvinyl chloride polymers.

When a polyvinyl chloride resin is reacted with magnesium in the presence of a cyclic tetramethylene or pentamethylene oxide, herein called a cyclic ether, I have discovered that it is possible to form the Grignard reagent, i.e., the organomagnesium chloride, by reaction of magnesium with only a portion of the chlorine atoms in the polymer. The amount of chlorine atoms reacted with magnesium is dependent on the process conditions.

The reaction with magnesium is accomplished by mixing magnesium with a solution of polyvinyl chloride and the cyclic ether, alone or with an inert hydrocarbon solvent as a diluent. Polyvinyl chloride polymers do not readily dissolve with the formation of a fluid solution in the cyclic ether. It is usually necessary to employ relatively dilute solutions in the cyclic ether alone, or in combination with an inert diluent to obtain a free-flowing solution which is readily handled. The reaction is preferably initiated by standard techniques, such as adding a small amount of an active halide alone or with diethyl ether and/or a crystal of iodine. Once the reaction is initiated between small amounts of the reactants, the larger portion of the reactants are added to the reaction mixture at a controlled rate. It is usually preferable to maintain the reaction mixture at reflux during the addition and subsequent reaction period. Where less rigorous conditions are suitable, desirable, or necessary, the reaction may be accomplished at lower temperatures. The reaction mixture is preferably agitated during the course of the reaction, and an inert atmosphere, e.g., nitrogen, which is cheapest, is preferably maintained.

The cyclic ether is a cyclic tetramethylene or pentamethylene oxide selected from the class consisting of tetrahydrofuran, tetrahydropyran, 2-methyltetrahydrofuran, 2-ethoxytetrahydropyran, tetrahydrofurfuryl ethyl ether, dihydropyran, and N-methylmorpholine. The cyclic ether also apparently functions as a solvent. Thus, a cyclic ether which has a high melting point may still function in this invention, but if it is used as solvent, obviously the high melting point (e.g., above 90° C.) causes great difficulty in carrying out the reaction.

Using the cyclic ether as the reaction medium, the polyvinylmagnesium chloride is believed to form complexes of the "etherate" type with the cyclic ether. The precise manner in which the cyclic ether is complexed is not entirely known. It is presumably complexed as polyvinyl MgCl·ether, but since Grignard reagents are also considered to exist according to the equilibrium:

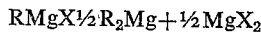

it is conceivable that the complex of the cyclic ether may exist as:

rather than as R·MgCl·(ether). Consequently, when referring to the complex of the invention, it is intended to encompass whichever form may actually exist.

As noted hereinbefore, the magnesium reacts with only a portion of the available chlorine atoms in the polyvinyl chloride polymer. Under standard conditions with reaction temperatures between room temperature and reflux temperatures, about 5% to about 15–20% of the available chlorine atoms would react with magnesium. By choice of the particular reactants utilized, e.g., specific polyvinyl chloride polymer, size of magnesium, etc., solvent system, and control of the process variables, it is possible to obtain specific desired percentages of chlorine atoms reacted with magnesium. Even higher percentages of chlorine could be reacted under more severe conditions, if desired. For most purposes of modifying polyvinyl chloride polymers it is preferred to introduce new functional groups at only about 10% of the available chlorine positions.

The polyvinyl chloride polymers which have been reacted with magnesium in accordance with the procedure herein may then be reacted with the conventional functional groups known to react with Grignard reagents. Such groups include carbon dioxide, cyanide, aldehydes, ketones, metal halides and organometallic halides, esters, etc. The Grignard synthesis with these materials is carried out under the standard procedures for Grignard synthesis.

For the purpose of giving those skilled in the art a better understanding of the invention, the following illustrative examples are given.

EXAMPLE 1

*Polyvinylmagnesium Chloride Complex*

One-half mole of polyvinyl chloride (taken as $C_2H_3Cl$) was reacted with ½ mole of magnesium turnings in the presence of tetrahydrofuran to form polyvinylmagnesium chloride complex.

EXAMPLE 2

One-half mole of magnesium and an iodine crystal were placed in the bottom of a flask to which was slowly added 10 ml. of a suspension of ½ mole of polyvinyl chloride in 12 moles of tetrahydrofuran. The reaction was initiated by the addition of 4 ml. of ethyl bromide and the remainder of the polyvinyl chloride/tetrahydrofuran slurry was slowly added. Temperature was maintained at about 60–70° C. At the completion of the reaction, it was determined by an acid titration test (modified Gilman) that 11% of the chlorine atoms present in the polyvinyl chloride polymers had reacted to form a Grignard. An analysis of the magnesium showed that 24% b.w. had been used up in the course of the reaction.

EXAMPLE 3

A procedure similar to Example 2 was used except that only 6 moles of tetrahydrofuran was employed. 10.5% yield of magnesium (titration method) was obtained.

EXAMPLE 4

*Modified Polymer by Reaction With Carbon Dioxide*

Dry carbon dioxide gas is bubbled slowly under the surface of a tetrahydrofuran solution of polyvinylmagnesium chloride until a negative Gilman test is obtained. The mixture is then heated at reflux. Cold, dilute hydrochloric acid is then added and the organic layer separated. The excess solvent is removed to recover the modified polymer which contains carboxylic acid groups.

EXAMPLE 5

Modified Polymer by Reaction With Acetone

To the preparation of polyvinylmagnesium chloride as described in Example 2 is slowly added a solution of 0.1 mole of acetone in 20 ml. of tetrahydrofuran. After the addition is completed, the mixture is refluxed for ½ hour, then cooled, and a solution of 10 ml. of concentrated hydrochloric acid in 100 ml. of water is added. The organic layer is separated from the water layer and washed several times with 100 ml. portions of water. The solvent is then removed to obtain the modified polymer which contains hydroxyl groups.

EXAMPLE 6

Modified Polymer by Reaction With Ethyl Acetate

To the preparation of Example 2 is slowly added a solution of 0.1 mole of ethyl acetate in 20 ml. of tetrahydrofuran. After the addition is completed, the reaction mixture is refluxed for ½ hour. It is then cooled and a solution of 10 ml. of hydrochloric acid in 100 ml. of water is slowly added. The organic layer is separated and the tetrahydrofuran is removed by distillation to yield a modified polymer containing carbonyl and hydroxyl groups.

By utilizing the present process, it is possible to obtain polyvinyl chloride Grignard polymers, having the reactive ·MgCl Grignard grouping at a relatively small number of carbon atoms, which may in turn be reacted with the numerous compounds known to react with Grignard reagents to form a host of modified polymers.

The modified polyvinyl chloride polymer obtained from the reaction with magnesium has the reactive Grignard groups (·MgCl) attached to carbon atoms (R).

By reacting the Grignard-containing polyvinyl chloride polymer with carbon dioxide, a polymer is obtained having carboxylic acid groups which would add water soluble properties; it would also have ion exchange properties. Another advantageous property may be imparted to polyvinyl chloride polymers by incorporating a cyanide group as by this Grignard synthesis to impart different dyeing characteristics to the resin. Resins which have been modified by reaction with aldehydes and ketones have improved adhesive properties and compatibility with epon type resins. These functional groups can be further reacted to form cross-linked and foamed resins of the urethane type.

While the invention has been described with particular reference to specific embodiments, it is to be understood that it is not limited thereto but is to be construed broadly and restricted solely by the scope of the appended claims.

I claim:

1. A process for preparing modified polyvinyl chloride polymers comprising reacting, under an inert atmosphere, polyvinyl chloride polymer with magnesium in the presence of a cyclic ether selected from the class consisting of tetrahydrofuran, tetrahydropyran, 2-methyltetrahydrofuran, 2-ethoxytetrahydropyran, tetrahydrofurfuryl ethyl ether, dihydropyran, and N-methylmorpholine, to react the magnesium with between about 5% and 20% of the chlorine atoms in the polyvinyl chloride polymer reactant and to form an etherate of said cyclic ether and the modified polyvinyl chloride polymer having reactive ·MgCl Grignard groups attached to the polymer at the positions where the chlorine reacted with magnesium.

2. The process of claim 1 in which the cyclic ether is tetrahydrofuran.

3. The process of claim 1 in which the cyclic ether is 2-methyltetrahydrofuran.

4. The process of claim 1 in which the cyclic ether is tetrahydropyran.

5. A modified polyvinyl chloride polymer, having reactive ·MgCl Grignard groups attached to the polymer in place of between about 5% and about 20% of the chlorine atoms, complexed with a cyclic ether selected from the class consisting of tetrahydrofuran, tetrahydropyran, 2 - methyltetrahydrofuran, 2 - ethoxytetrahydropyran, 2-methyltetrahydrofuran, 2-dihydropyran, and N-methylmorpholine.

6. The composition of claim 5 in which the cyclic ether is tetrahydrofuran.

References Cited in the file of this patent

UNITED STATES PATENTS

| | | |
|---|---|---|
| 2,464,751 | Richter | Mar. 15, 1949 |
| 2,475,520 | Roedel | July 5, 1949 |

FOREIGN PATENTS

| | | |
|---|---|---|
| 1,137,255 | France | May 27, 1957 |

OTHER REFERENCES

Pierce et al.: "Fluorine-Containing Elastomers," WADC Technical Report 52–191, Part 2; ASTIA, AD No. 23169 (October 1953), page 25.

Kharasch et al.: "Grignard Reactions of Nonmetallic Substances," Prentice-Hall Co. (1954), page 37.